United States Patent
Kindij

[15] 3,692,925
[45] Sept. 19, 1972

[54] HIGH VOLTAGE ELECTRICAL CABLE

[72] Inventor: Eugen Kindij, Hannover, Germany

[73] Assignee: Kabel-und Metallwerke Gutehoffnungshutte Aktiengesellschaft, Hannover, Germany

[22] Filed: April 28, 1971

[21] Appl. No.: 138,177

[30] Foreign Application Priority Data
April 30, 1970 Germany..........P 20 21 172.7

[52] U.S. Cl............174/120 C, 174/36, 174/120 SC, 174/120 SR
[51] Int. Cl.............................................H01b 7/02
[58] Field of Search........174/120 R, 120 C, 120 SC, 174/120 SR; 117/36, 232

[56] References Cited
UNITED STATES PATENTS

| | | | |
|---|---|---|---|
| 3,126,358 | 3/1964 | Lemmerich | 117/232 |
| 3,361,871 | 1/1968 | Brandt | 174/120 R |
| 3,378,628 | 4/1969 | Garner | 174/120 R |

*Primary Examiner*—E. A. Goldberg
*Attorney*—Philip G. Hilbert

[57] ABSTRACT

A high voltage electrical cable including olefin polymer insulation such as polyethylene, polypropylene and the like, together with protective layers of synthetic resin such as polyvinyl chloride or epoxide resin which has an electrical breakdown anisotropy less than the olefin polymer insulation; the protective layer of resin being applied to one or both surfaces of the olefin polymer insulation.

6 Claims, 1 Drawing Figure

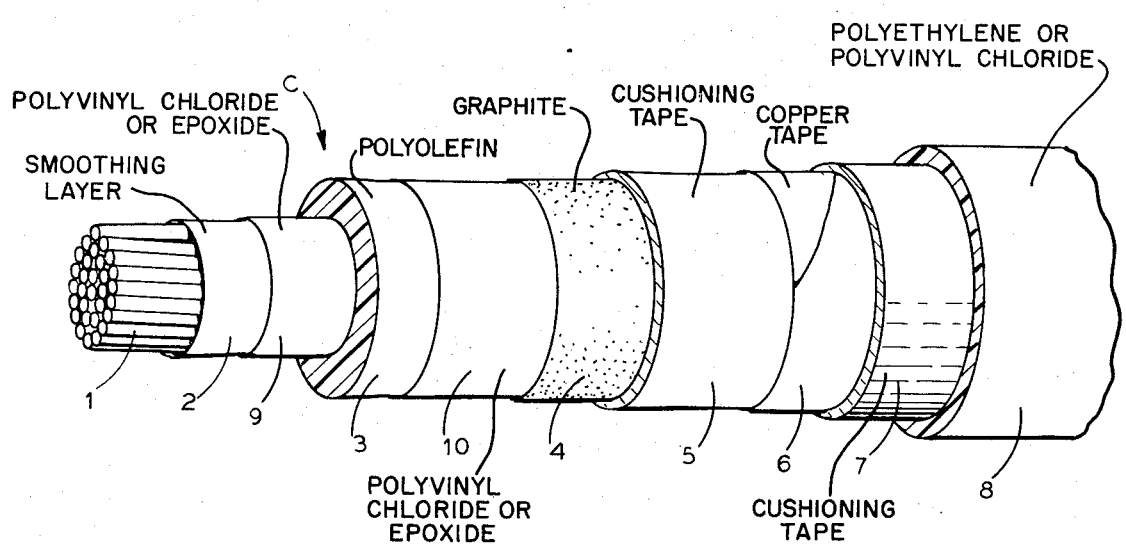

HIGH VOLTAGE ELECTRICAL CABLE

Electrical cables conventionally include olefin polymer resin such as polyethylene, polyisobutylene, polypropylene resins as a dielectric covering for the conductors thereof. In order to increase the covering strength of the resins, it is known to add voltage stabilizers to the resins.

However such known voltage stabilized resins still show breakdowns, particularly at relatively high voltages. Thus, it has been found that such breakdowns may be traced as being initiated by fine channels and branchings thereof and the magnitude and type of imposed voltages which may last for microseconds or extended time periods. Also, mechanical loading may adversely affect the dielectric strength of the insulation.

Thus, experiments have indicated that with polyethylene, the creep strength factor related to time is reduced by a factor of 10 under the influence of mechanical stress in tension or strains. It is however essential that in connection with such reduced creep strength factor related to time, exhibits a preferred direction of breakdown in the polyethylene which acts in a direction perpendicularly to the direction of the mechanical stress or strain. This property is referred to as electrical breakdown anisotropy.

Accordingly, an object of this invention is to provide electrical cables for use with high and ultra high voltages, which may be subject in fabrication, in transport and in installation, to mechanical loadings which lead to a reduction in dielectric strength of the insulation, wherein the insulation such as polyethylene is provided on at least one surface thereof with a protective layer of synthetic resin which has an electrical breakdown anisotropy which is much less than that of the insulation.

Another object of this invention is to provide a high voltage cable of the character described, wherein the protective layer is polyvinyl chloride which has a relatively small thickness as compared to that of the insulation.

A further object of this invention is to provide an electrical cable of the character described wherein channeling and branch formation thereof incident to voltage stresses, is limited to the thin protective layers, leaving the such channeling and branch formation markedly reduced due to the reduced anisotropy of the protective layers.

Other objects of this invention will in part be obvious and in part hereinafter pointed out.

DESCRIPTION OF THE DRAWING

The single FIGURE is a perspective view showing a cable embodying the invention, with parts cut away and parts in section.

DESCRIPTION OF THE PREFERRED EMBODIMENT

As shown in the FIGURE, a high voltage electrical cable embodying the invention is generally indicated at C. The same comprises the usual conductor core 1 which may be of the stranded type formed from copper or aluminum. The outer surface of core 1 is smoothed by the application of a thin layer of conductive copolymer in extruded form, as indicated at 2. Such copolymer is well known in the cable forming art.

The dielectric insulation 3 for the cable core 1 is formed of polyethylene which may be modified with stabilizing additives, known in the art. A conductive layer such as a graphite deposit is indicated at 4, for limiting the field strength. To protect the layer 4 from mechanical damage, a spirally wound tape 6 of copper tape is provided.

A cushioning layer 5 of wound tapes of graphite soaked textile fabric, crepe paper or felt to cope with possible spatial displacement of the shield 6 and insulation 3. Another cushioning layer 7 of synthetic resin tape or the like, is disposed over the shield 6. A sheath 8 of polyethylene or polyvinyl chloride provides the outer protective covering for cable C.

To substantially improve the dielectric properties of insulation 3, and to increase the overall dielectric strength; insulation 3 is covered by an inner layer 9 and an outer layer 10 which layers are in continuous contact with the inner and outer surfaces respectively of insulation 3.

The layers 9, 10 are of polyvinyl chloride and have a thickness ranging from about 0.2 mm to about 0.8 mm. It has been found that the polyvinyl chloride in thin layer form shows a relatively small electrical breakdown anisotropy and is effective to prevent rapid growth of channel and branching formations under voltage conditions which would normally tend to initiate breakdowns, more particularly in respect to the inner layer 9.

The outer layer 10 is highly effective in conditions of high tensile stresses. When such stresses are not anticipated, layer 10 may be omitted; leaving layer 9 to provide protection against effective field strengths as indicated above. Such layer 9 may have a thickness of 0.3 mm.

In lieu of polyvinyl chloride, layers 9 and 10 may be formed of epoxide resins, which also exhibit a breakdown anisotropy substantially less than that of the olefin polymer insulation 3 such as polyethylene, polyisobutylene or polypropylene.

While layers 9 and 10 may have a larger lossangle then insulation 3, little change accrues therefrom. As layers have a relatively small thickness ranging from 0.2 mm to 0.8 mm in accordance with the voltage applied; the mass thereof is so little as to have little or no effect on the heating of the cable.

I claim:

1. In a high voltage electrical cable comprising a conductor, an olefin polymer insulation for the conductor and a synthetic resin sheath; a thin protective layer of synthetic resin in contact with one of the surfaces of said polymer insulation, said protective layer having an electrical breakdown anistropy smaller than that of said polymer insulation, said protective layer being in contact with the inner surface of said polymer insulation.

2. A cable as in claim 1 wherein said polymer insulation is polyethylene.

3. A cable as in claim 1, wherein said protective layer further comprises a layer in contact with the outer surface of said polymer layer.

4. A cable as in claim 1, wherein said protective layer is polyvinyl chloride.

5. A cable as in claim 1, wherein said protective layer is an epoxide resin.

6. A cable as in claim 1, wherein said protective layer has a thickness of from about 0.2 mm to about 0.8 mm.

* * * * *